United States Patent
Wikström et al.

(10) Patent No.: US 10,313,958 B2
(45) Date of Patent: Jun. 4, 2019

(54) RECEIVING NODE, TRANSMITTING NODE, AND METHODS THEREIN FOR HANDLING CHANNEL ACCESS

(71) Applicant: Telefonaktiebolaget LM Ericsson (publ), Stockholm (SE)

(72) Inventors: Gustav Wikström, Täby (SE); Johan Söder, Stockholm (SE); Yu Wang, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 28 days.

(21) Appl. No.: 15/536,032

(22) PCT Filed: Feb. 10, 2015

(86) PCT No.: PCT/SE2015/050154
§ 371 (c)(1),
(2) Date: Jun. 14, 2017

(87) PCT Pub. No.: WO2016/130056
PCT Pub. Date: Aug. 18, 2016

(65) Prior Publication Data
US 2017/0353911 A1    Dec. 7, 2017

(51) Int. Cl.
*H04B 17/00*    (2015.01)
*H04W 48/02*    (2009.01)
(Continued)

(52) U.S. Cl.
CPC ........... *H04W 48/02* (2013.01); *H04W 48/16* (2013.01); *H04W 74/0808* (2013.01); *H04W 84/12* (2013.01)

(58) Field of Classification Search
CPC ... H04W 88/02; H04W 88/08; H04W 52/265; H04W 36/20; H04W 72/082;
(Continued)

(56) References Cited

U.S. PATENT DOCUMENTS

| 7,443,821 B2 | 10/2008 | Cave et al. |
| 7,623,494 B2 | 11/2009 | Zhu et al. |

(Continued)

FOREIGN PATENT DOCUMENTS

| JP | 4406650 B2 | 2/2010 |
| WO | 2007043921 A1 | 4/2007 |

(Continued)

OTHER PUBLICATIONS

Hedayat, Reza et al., "Considerations for Adaptive CCA," Presentation, doc.:IEEE 802.11-14/1448r2, Nov. 3, 2014, IEEE, 13 slides.
(Continued)

*Primary Examiner* — Nhan T Le
(74) *Attorney, Agent, or Firm* — Withrow & Terranova, PLLC

(57) ABSTRACT

A method performed by a transmitting node for handling a channel access for transmitting data to a receiving node is provided. The transmitting node and the receiving node operate in a wireless communications network. The transmitting node obtains a defer list. The defer list comprises nodes causing Signal to Interference Ratio, SIR, below a threshold at the receiver node. The defer list is based on a first defer list received from and created by the receiving node. The transmitting node senses a wireless channel in the wireless communications network. When the transmitting node intends to transmit data to the receiving node, the transmitting node defers channel access to the sensed wireless channel for the data transmission when one or more conditions are fulfilled. The one or more conditions comprise at least that one or more nodes are sensed as communicating and are on the defer list.

22 Claims, 8 Drawing Sheets

(51) Int. Cl.
*H04W 84/12* (2009.01)
*H04W 74/08* (2009.01)
*H04W 48/16* (2009.01)

(58) Field of Classification Search
CPC . H04W 74/0808; H04W 36/30; H04W 48/16; H04W 48/02; H04W 52/0245; H04W 52/241; H04W 52/245; H04W 72/1231; H04W 88/12; H04W 72/085; H04W 72/0406; H04W 92/20
See application file for complete search history.

(56) References Cited

U.S. PATENT DOCUMENTS

| | | | |
|---|---|---|---|
| 7,830,848 B2 | 11/2010 | Mhatre et al. | |
| 7,869,794 B1* | 1/2011 | Weaver | H04W 4/14 370/349 |
| 2003/0100267 A1* | 5/2003 | Itoh | H04B 17/382 455/69 |
| 2005/0192037 A1 | 9/2005 | Nanda et al. | |
| 2006/0046739 A1 | 3/2006 | Blosco et al. | |
| 2007/0021086 A1* | 1/2007 | Chiu | H04B 1/7117 455/277.1 |
| 2007/0242621 A1 | 10/2007 | Nandagopalan et al. | |
| 2009/0067329 A1* | 3/2009 | Sumasu | H04W 72/085 370/232 |
| 2013/0017794 A1 | 1/2013 | Kloper et al. | |
| 2014/0112175 A1 | 4/2014 | Pantelidou et al. | |
| 2014/0254459 A1 | 9/2014 | Gelal et al. | |
| 2014/0328191 A1 | 11/2014 | Barriac et al. | |

FOREIGN PATENT DOCUMENTS

| | | |
|---|---|---|
| WO | 2014001602 A1 | 1/2014 |
| WO | 2014011094 A1 | 1/2014 |

OTHER PUBLICATIONS

International Search Report and Written Opinion for International Patent Application No. PCT/SE2015/050154, dated Nov. 4, 2015, 12 pages.

Supplementary European Search Report for European Patent Application No. 15882185.0, dated Jan. 18, 2018, 3 pages.

* cited by examiner

401. Create a first defer list with nodes causing SIR below a threshold.

402. Send created first defer list to transmitting node.

RECEIVING NODE, TRANSMITTING NODE, AND METHODS THEREIN FOR HANDLING CHANNEL ACCESS

This application is a 35 U.S.C. § 371 national phase filing of International Application No. PCT/SE2015/050154, filed Feb. 10, 2015, the disclosure of which is incorporated herein by reference in its entirety.

TECHNICAL FIELD

Embodiments herein relate to a receiving node, a transmitting node and methods therein. In particular, it relates to handling channel access for transmitting data from the transmitting node to the receiving node.

BACKGROUND

In Institute of Electrical and Electronics Engineers (IEEE), Wi-Fi, also known as Wireless Local Area Network (WLAN), which terms will be used interchangeably throughout this document, is standardized in the 802.11 specifications such as IEEE Standard for Information technology—Tele-communications and information exchange between systems. Local and metropolitan area networks—Specific requirements. Part 11: Wireless LAN Medium Access Control (MAC) and Physical Layer (PHY) Specifications.

Wi-Fi is a technology that currently mainly operates on the 2.4 GHz or the 5 GHz band. The IEEE 802.11 specifications regulate a Station (STA) physical layer, Media Access Control (MAC) layer and other aspects to secure compatibility and inter-operability between access points and portable terminals, here also referred to as UE's. A STA which e.g. may be an access point or a wireless terminal, is a device that has the capability to use the 802.11 protocol. Wi-Fi is generally operated in unlicensed bands. As such, communication over W-Fi may be subject to interference sources from any number of both known and unknown devices. W-Fi is commonly used as wireless extensions to fixed broadband access, e.g., in domestic environments and hotspots, like airports, train stations and restaurants.

Clear Channel Assessment (CCA) Threshold

The WLAN technology relies on Carrier Sensing Multiple Access with Collision Avoidance (CSMA/CA) in order to effectively and fairly share the wireless medium among different WLAN entities and even different Radio Access Technologies (RAT). CSMA/CA applied by the WLAN system demands that every device that wishes to send data senses the common communication channel before carrying a transmission in order to avoid duplicate transmissions, commonly resulting in loss of data and need of retransmissions. In order for a device to deem the channel busy, it has to detect a transmission, the received signal strength level of which surpasses a pre-determined threshold, referred to as the Clear Channel Assessment (CCA) threshold (CCAT). An exemplary relation between the CCAT and the spatial area within which transmitting nodes will cause an Access Point (AP) to defer from transmitting is depicted in FIG. 1. FIG. 1 depicts a scenario where the same CCAT is used regardless of the intended receiver of the upcoming transmission.

The AP will defer from transmitting since the received signal power from nodes within this area is above the CCAT. In current systems one common CCAT is defined for all nodes, to be used when performing channel sensing for transmission to and from any node in the network.

In WLANs, a CCA threshold is specified to define a range within which a WLAN node, e.g. an AP or a STA, will sense the transmission of other WLAN devices to avoid transmission collision. Herein, a WLAN node is node operating in a WLAN such as a WiFi.

Using one or more thresholds based on received power is not optimal from a performance perspective, since nodes in the network may be prevented from transmitting even though the transmission is likely to be successful.

SUMMARY

It is therefore an object of embodiments herein to increase the performance in a wireless communications network.

According to a first aspect of embodiments herein, the object is achieved by a method performed by a receiving node for assisting a transmitting node in handling a channel access for transmitting data to the receiving node. The transmitting node and the receiving node operate in a wireless communications network.

The receiving node creates a first defer list. In the first defer list a node is added when causing signal to interference ratio, SIR, below a threshold at the receiver node.

The receiving node then sends the created first defer list to the transmitting node. The first defer list enables the transmitting node to decide whether or not to defer channel access to a sensed wireless channel for the data transmission, when the transmitting node intends to transmit data to the receiving node.

According to a second aspect of embodiments herein, the object is achieved by a method performed by a transmitting node for handling a channel access for transmitting data to a receiving node. The transmitting node and the receiving node operate in a wireless communications network.

The transmitting node obtains a defer list. The defer list comprises nodes causing Signal to Interference Ratio, SIR, below a threshold at the receiver node. The defer list is based on a first defer list received from and created by the receiving node.

The transmitting node senses a wireless channel in the wireless communications network.

When the transmitting node intends to transmit data to the receiving node, the transmitting node defers channel access to the sensed wireless channel for the data transmission when one or more conditions are fulfilled. The one or more conditions comprise at least that one or more nodes are sensed as communicating and are on the defer list.

According to a third aspect of embodiments herein, the object is achieved by a receiving node for assisting a transmitting node in handling a channel access for transmitting data to the receiving node. The transmitting node and the receiving node are adapted to operate in a wireless communications network. The receiving node is configured to:

Create a first defer list, in which first defer list a node is adapted to be added when causing signal to interference ratio, SIR, below a threshold at the receiver node, and Send the created first defer list to the transmitting node. The first defer list enables the transmitting node to decide whether or not to defer channel access to a sensed wireless channel for the data transmission, when the transmitting node intends to transmit data to the receiving node.

According to a forth aspect of embodiments herein, the object is achieved by a transmitting node for handling a channel access for transmitting data to a receiving node. The transmitting node and the receiving node are adapted to operate in a wireless communications network. The transmitting node is configured to:

Obtain a defer list. The defer list is adapted to comprise nodes causing Signal to Interference Ratio, SIR, below a threshold at the receiver node. The defer list is adapted to be based on a first defer list received from and created by the receiving node.

Sense a wireless channel in the wireless communications network.

Defer channel access to the sensed wireless channel for the data transmission when the transmitting node intends to transmit data to the receiving node and when one or more conditions are fulfilled. The one or more conditions comprise at least that one or more nodes are sensed as communicating and being on the defer list.

It is an advantage that the defer list is created in the receiving node compared to the transmitting node, since the receiving node is aware of which transmissions it can coexist with. This is hard for the transmitting node to know, since it can only measure the signal level at its own position. Since the defer list is created in the receiving node and is sent to the transmitting node, the transmitting node can decide if it shall defer from accessing the wireless channel when sensing the availability of the wireless channel in the wireless communications network. The consequence of this is increased performance in the wireless communications network which is a result of increased usage of the wireless channel since several transmissions may be active simultaneously.

A further advantage with embodiments herein is that the wireless network comprising several access points can carry a higher traffic load. The end user experience is also improved since the delay times of a data transfer session will be reduced due to faster access to the wireless channel.

BRIEF DESCRIPTION OF THE DRAWINGS

Examples of embodiments herein are described in more detail with reference to attached drawings in which.

DETAILED DESCRIPTION

As part of developing embodiments herein, a problem will first be identified and shortly discussed.

As mentioned above, using one or more thresholds based on received power is not optimal from a performance perspective, since nodes in the network may be prevented from transmitting even though the transmission is likely to be successful. Instead the benefit and cost should be evaluated for each node and each transmission using lists of accepted and not accepted simultaneous transmissions.

Figure 1:
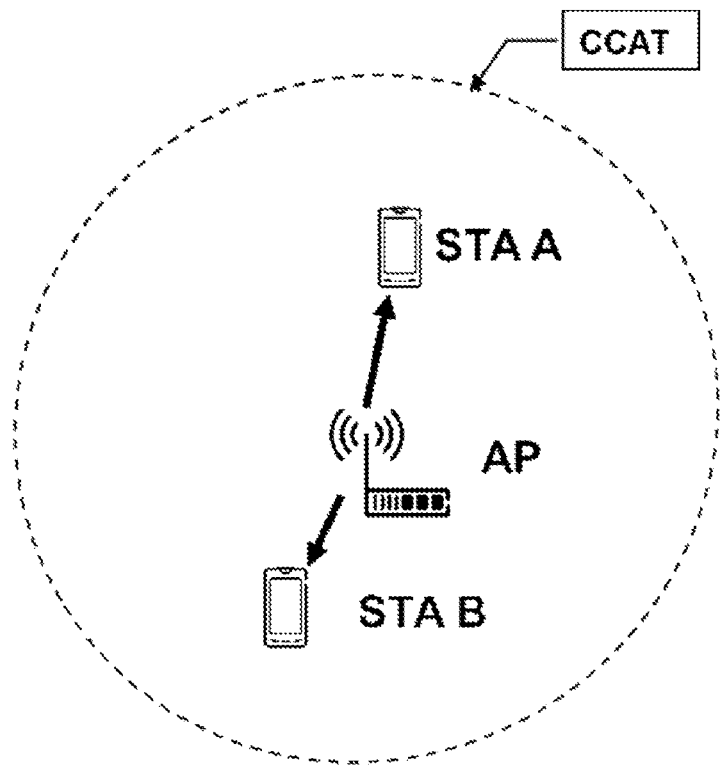
FIG. 1 is a schematic block diagram illustrating a communications network according to prior art.
Figure 2:
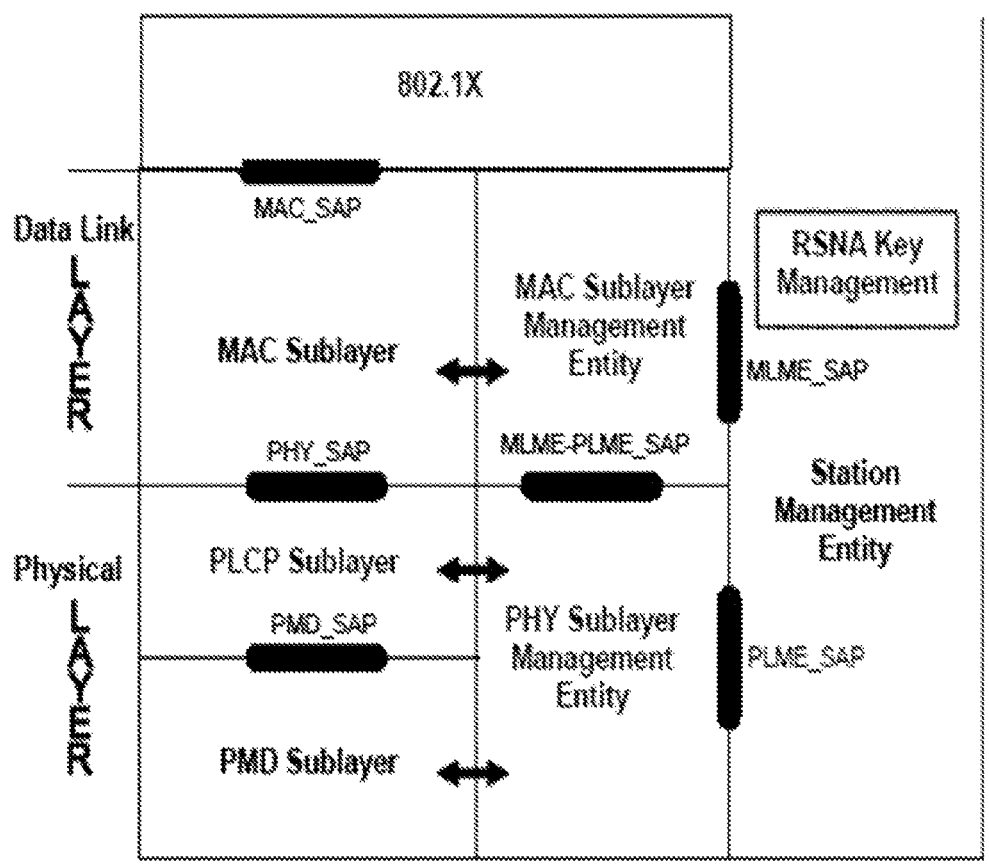
FIG. 2 is a schematic block diagram illustrating a communications protocol according to prior art.

The IEEE layer specifications including Physical Medium Dependent (PMD), Physical Layer Convergence Protocol (PLCP), MAC/Logical Link Control (LLC) is shown in FIG. 2 which depicts a WLAN protocol stack. Since the PLCP sublayer performs CCA and reports the results to the MAC, the CCA threshold is set in the PLCP sublayer. In FIG. 2 the following abbreviations are shown: PHY Layer Management Entity (PLME), MAC subLayer Management Entity (MLME), Service Access Point (SAP), Robust Security Network Association (RSNA).

By using one threshold only in the STA or AP for the CCA, a node can be prevented from transmitting even if the transmission is likely to be successful and unlikely to disturb any ongoing transmissions. It is therefore not an efficient use of the available spectrum. On the other hand, higher CCAT settings increase the risk of having strong interference during a transmission.

Preferably three tasks should be fulfilled through the CCA. The first is to avoid collision, e.g. avoid transmitting to a node that is transmitting or receiving data already. The second is to make sure that the intended transmission is received with acceptable SINR. The third is that ongoing transmissions should be protected.

The proximity of a transmitter, i.e. a transmitting node, to an interfering node is not a good measure of the interference power on the receiver side. Likewise, the proximity to an interfering node is not a good measure of how much the intended transmission will impact the ongoing transmission.

Therefore, measuring on the transmitter side only is not sufficient for evaluating CCA in an effective manner.

Embodiments herein relates to techniques to reduce the impact of interference in e.g. a WLAN MAC.

Figure 3:
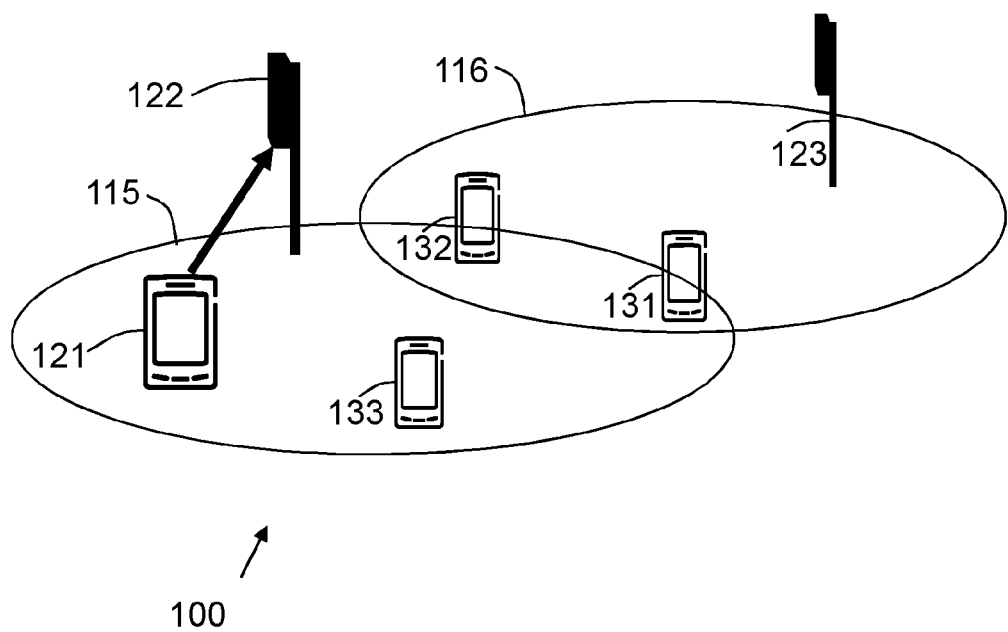
FIG. 3 is a schematic block diagram illustrating embodiments of a communications network.

FIG. 3 depicts a wireless communications network 100 also referred to as a communications system, in which embodiments herein may be implemented. The wireless communications network 100 is e.g. a carrier sensing based wireless network such as an 802.11 WLAN or a 3GPP LAA-LTE which may be referred to as a WiFi network, or any 3GPP LTE system operating in unlicensed band through License Assisted Access (LAA).

Two or more communication devices operate in the wireless communications network 100, whereof a transmitting node 121 and a receiving node 122 are depicted in FIG. 3. The nodes are termed transmitting node 121 and receiving node 122 for simplicity, since the first node 121 is to transmit data to the receiving node 122 in the example used herein. In other scenarios beyond the example herein, the transmitting node 121 may receive data and the receiving node 122 may transmit data. The transmitting node 121 and the receiving node 122 are wireless devices.

In some example scenarios as in the scenario depicted in FIG. 3, the transmitting node 121 is an AP or an integrated/co-located base station such as e.g. eNB-WLAN base station or an LAA-LTE base station, for a STA to access the wireless communications network 100. In these scenarios, the transmitting node 121 serves an area 115.

In some other scenarios, not shown, the transmitting node 121 is a STA such as a mobile wireless terminal, a mobile phone, a computer such as e.g. a laptop, or a tablet computer, sometimes referred to as a surf plates, with wireless capabilities, or any other radio network units capable to communicate over a radio link in a wireless communications network 100.

In some embodiments, the transmitting node 121 operates in a Basic Service Set (BSS). In an example scenario a node 123 or one or more nodes 123 operate in a neighbouring BSS. The neighbouring BSS is a neighbour to the BSS in which the transmitting node 121 is operating. The node 123 may be an AP as in FIG. 3 or a STA, which is not shown. In these scenarios, the node 123 serves an area 116.

In some scenarios as in the scenario depicted in FIG. 3, the receiving node 122 is a STA such as a mobile wireless terminal, a mobile phone, a computer such as e.g. a laptop, or a tablet computer, sometimes referred to as a surf plates, with wireless capabilities, or any other radio network units capable to communicate over a radio link in the wireless communications network 100.

In some other scenarios not shown, the receiving node 122 is an AP or an integrated/co-located base station such an eNB-WLAN base station or an LAA-LTE base station for a STA to access the wireless communications network 100. In these scenarios, the receiving node 122 serves an area 115.

In some scenarios as in the scenario depicted in FIG. 3, one or more further nodes operate in the wireless communications network 100. E.g. a first node 131 which may be a STA as in FIG. 3 or an AP (not shown), a second node 132 which may be a STA as in FIG. 3 or an AP which is (not shown) and/or a third node 133 which may be a STA as in FIG. 3 or an AP (not shown). The third node 133 is operating in the same BSS as the transmitting node 121.

Embodiments herein provides a method for a node such as the transmitting node 121 to decide if the said node should defer from accessing a wireless channel when sensing the availability of the channel in a carrier sensing based wireless network, e.g. the wireless communications network 100 such as a WLAN. Embodiments herein introduces several mechanisms for improving air efficiency and user experience in e.g. a WLAN system by means of determining and communicating lists of defer nodes. The embodiments increase spatial reuse of a carrier sensing based system while limiting the interference perceived by receivers. By spatial reuse is meant to what degree simultaneous transmissions may be present in the different BSSs of the network. If the BSSs are forced to always defer for each other, i.e. whenever there is an ongoing transmission in the BSS covering area 115, no transmission may be initiated in the BSS covering area 116, the spatial reuse is 50%. If however the BSSs are independent of each other and never refrain from transmissions when there is an ongoing transmission in the other BSS, the spatial reuse is 100%.

According to embodiments herein, a defer list is created in each receiver node such as in the receiving node 122. The nodes on the defer list cause strong interference to the receiving node 122.

The created first defer list is sent to the transmitting node 122 in order to form or update a Defer List Tx in the transmitting node 121. The transmitting node 121 will defer channel access if a node on the defer list Tx is sensed as transmitting already. In FIG. 3, the first defer list created in the receiving node 122 is sent to the transmitting node 122 which e.g. updates a defer list Tx stored in it.

The created first defer list may then be sent to the interferers such as the first node 131 and the second node 132, possibly via node 123 in order to form or update a defer list Rx stored in them. The first node 131 and the second node 132 will defer channel access if a node on the defer list Rx is sensed as receiving already.

Contents in the Defer List (L)

The nodes on the defer list are nodes that cause strong interference to the receiving node 122, or nodes that are strongly interfered by the transmitting node 121, and will thus be impacted if communicating while the transmitting node 121 initiates a transmission. The Defer List may comprise node identifiers to identify the nodes on the defer list. The defer list may comprise a defer list relating to reception (defer list Rx) and a defer list relating to transmission (defer list Tx).

The defer list Tx stored by a transmitting node and related to a receiving node is a list that comprises nodes that, when actively transmitting, cause strong interference to the receiving node.

The defer list Rx stored by a transmitting node is a list that comprises nodes that will be interfered by the transmitting node when it is actively transmitting a signal at the same time as the nodes on the defer list Rx are trying to receive another signal.

Figure 4:
FIG. 4 is a flowchart depicting embodiments of a method in a receiving node.

Example embodiments of a method performed by the receiving node 122 for assisting the transmitting node 121 in handling a channel access for transmitting data to the receiving node 122 will now be described with reference to a flowchart depicted in FIG. 4.

As mentioned above, the transmitting node 121 and the receiving node 122 operate in a wireless communications network 100. The method comprises the following actions, which actions may be taken in any suitable order.

Action 401

The receiving node 122 creates a first defer list, in which first defer list a node such as any of the nodes 131, 132, 133, is added when causing signal to interference ratio, SIR, below a threshold at the receiving node 122. The nodes on the defer list cause strong interference to the receiving node 122.

The defer list may be updated each time the receiving node senses the wireless medium and identifies an active transmitter.

Action 402

The receiving node 122 then sends the created first defer list to the transmitting node 121. The first defer list enables the transmitting node 121 to decide whether or not to defer channel access to a sensed wireless channel for the data transmission, when the transmitting node 121 intends to transmit data to the receiving node 122.

In some embodiments, the first defer list is further transmitted to one or more nodes in the neighbouring BSS, or to an Overlapping BSS (OBSS). This may e.g. be sent over the internet or through a central node in the network, e.g. an access controller node. As mentioned above the neighbouring BSS is a neighbour to a BSS associated with the receiving node 122.

The first defer list may comprise any one or more out of a defer list relating to reception, defer list Rx, and a defer list relating to transmission, defer list Tx.

The first defer list may further be sent to interfering nodes. Thus the first defer list may further be transmitted to the first node 131, when the first node 131 causes a SIR, below the threshold at the receiving node 122.

The advantage of creating the defer list in the receiving node 122 is that the receiving node 122 knows which nodes are strong interferers to the receiving node 122, but the transmitting node 121 does not know which nodes are strong interferers to the receiving node 122.

Example embodiments of a method performed by the transmitting node 121 for handling a channel access for transmitting data to a receiving node 122 will now be described with reference to a sequence diagram depicted in FIG. 5. As mentioned above, the transmitting node 121 and the receiving node 122 operate in the wireless communications network 100.

The method comprises the following actions, which actions may be taken in any suitable order.

Action 501

In an example embodiment, the transmitting node 121 receives the first defer list from the receiving node 122. The first defer list will be used to form the defer list in the transmitting node 121 as will be described in Action 503 below.

Action 502

In some embodiments, the transmitting node 121 receives a second defer list from the node 123 in a neighbouring BSS or OBSS. As described in Action 503 below, the second defer list will be used together with first defer list to form the defer list in the transmitting node 121, or to update a previous defer list comprised in the transmitting node 121. The second list is sent to ensure that the transmitting node 121 will not create harmful interference to any ongoing transmissions in the neighbour BSS.

Action 503

In this action the transmitting node 121 uses the first defer list and possibly also the second defer list to create a defer list or update a previous defer list in the transmitting node 121. Accordingly, the transmitting node 121 obtains a defer list. As mentioned above, the defer list comprises nodes 131, 132, 133 causing Signal to Interference Ratio, SIR, below a threshold at the receiving node 122. The defer list is based on a first defer list received from and created by the receiving node 122, as described in Action 501 and 401 above.

The defer list may comprise any one or more out of a defer list Rx and a defer list Tx.

In some embodiments, the transmitting node 121 receives a second defer list from a node 123 in a neighbouring BSS or OBSS as described above in Action 502. The second defer list will be used together with first defer list to form the defer list in the transmitting node, or to update a previous defer list comprised in the transmitting node 121.

Thus the transmitting node 121 may obtain the defer list by forming the defer list in the transmitting node 121 further based on said received second defer list.

Thus as an alternative, the transmitting node 121 may obtain the defer list by updating a previous defer list comprised in the transmitting node 121 further based on said received second defer list.

Action 504

In the example scenario, the transmitting node 121 is to send data to the receiving node 122 and it is looking for a suitable time to access the channel. The transmitting node 121 senses a wireless channel in the wireless communications network 100. This may be performed through listening to the wireless medium.

Action 505

When the transmitting node 121 intends to transmit data to the receiving node 122, the transmitting node 121 defers channel access to the sensed wireless channel for the data transmission when one or more conditions are fulfilled. The one or more conditions comprise at least that one or more nodes are sensed as communicating and being on the defer list.

When the transmitting node 121 intends to transmit to the receiving 122, it will defer channel access if:

The first node 131 is sensed as transmitting and the first node 131 is on the defer list Tx in the transmitter 121. The first defer list was sent from the receiving node 122 since it previously sensed the first node 131 to cause to high interference, i.e. too low Signal-to-Interference ratio.

The second node 132 is sensed as receiving and the transmitting node 121 is on the defer list Rx of the second node 132.

The third node 133 is sensed as transmitting and it is a node in the same BSS as the transmitting node 121.

This means that in some embodiments, the one or more nodes being sensed as communicating and being on the defer list comprises any one out of:

The first node 131 is sensed as transmitting and the first node 131 is on the Defer List Tx, and The second node 132 is sensed as receiving and the second node 133 is on the Defer List Rx.

The Defer List Tx may be based on the first defer list received from and created by the receiving node 122.

The Defer List Rx may be based on the second defer list. The second defer list may be received from the node 123 in the neighbouring BSS or an OBSS, e.g. over the internet. The neighbouring BSS is a neighbour to a BSS in which the transmitting node 121 is operating.

In some embodiments, the one or more conditions to be fulfilled further comprises that a third node 133 is sensed as transmitting and which third node 133 is operating in the same BSS as the transmitting node 121.

The one or more conditions to be fulfilled may further comprise that a receiving power at the transmitting node 121 is above a threshold.

Embodiment's herein will now be further described and explained. The text below is applicable to and may be combined with any suitable embodiment described above.

Embodiments herein provide a method for a node such as the transmitting node 121 to decide if the said node should defer from accessing a wireless channel when sensing the availability of the channel in a carrier sensing based wireless network, e.g. WLAN.

In a first step relating to Action 401, a defer list such as the first defer list, is created in each receiver node such as the receiving node 122. A node is added to the list if the node generates interference to the receiver and the interference power is higher than a threshold or SIR is less than a threshold.

The said list is then communicated to other nodes in the same BSS or OBSSs. This relates to Action 402 above. In one embodiment, the communication is realized by established wireless connection between nodes, e.g. between associated AP and STA. As an alternative, the said receiving node 122 may broadcast the list to other nodes such as the first node 131 and the second node 132. A node may further transfer received lists to other nodes. For example, an AP such as the transmitting node 121 may receive the lists of associated STAs such as the receiving node 122 and pass the lists to neighbor APs such as the node 123. In another embodiment, the list may be communicated via a management interface, e.g. from one AP such as the transmitting node 121 via an Access Controller (AC). An AC is a central network node connected to several APs handling coordination and authentication signaling between them.

Figure 6:
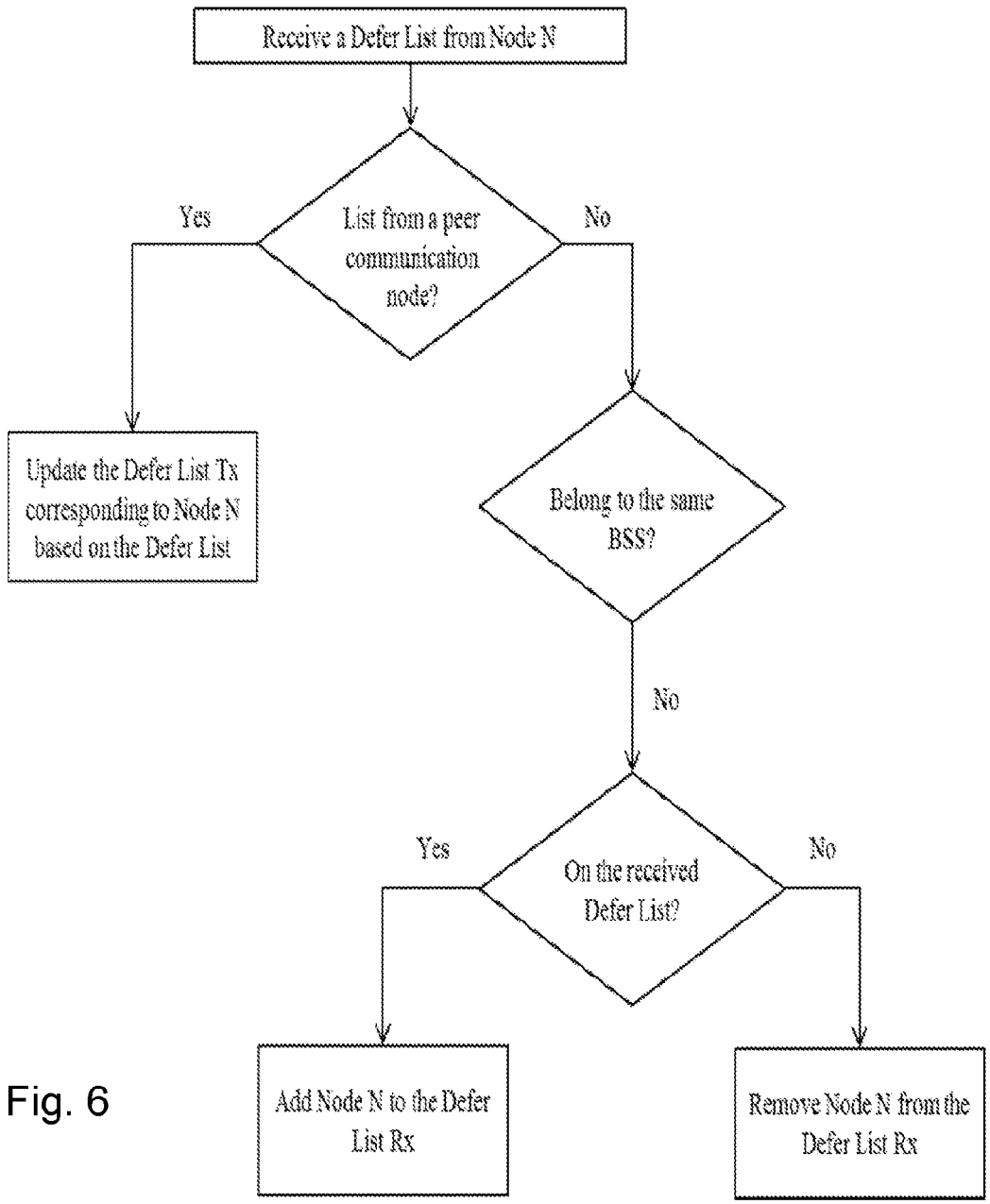
FIG. 6 is a flowchart depicting embodiments of a method.

A flow chart for processing of received defer list as described below is depicted in FIG. 6. In FIG. 6, the receiving node is represented by Node N. Embodiments herein further provide methods to process a received defer list, e.g. from the receiving node 122, Node N, to the transmitting node 121 Referring again to FIG. 3, for example, if the receiving node 122, Node N, is a peer communication node of the transmitting node 121, i.e. peers between which the data shall be transmitted, e.g. associated STA or the serving AP, the transmitting node 121 will update a defer list Tx corresponding to the receiving node 122, Node N. One defer list Tx is maintained for each receiver associated to the transmitting node 121. If the node 121 is an AP, it communicates with several other nodes and must keep track of which defer list is connected to which receiver. Transmission from the transmitting node 121 to the receiving node 122, Node N, will be deferred if any node in the defer list Tx corresponding to the receiving node 122, Node N, is sensed transmitting.

If the receiving node 122, Node N, is not a peer communication node of the transmitting node 121, and the receiving node 122, Node N, and the transmitting node 121 do not belong to the same BSS, the transmitting node 121 will check if the transmitting node 121 is on the received Defer List. If it is the case, the transmitting node 121 will add the receiving node 122, Node N, to a defer list Rx if the receiving node 122, Node N, is not on the list yet.

Otherwise, if the transmitting node 121 is not on the received defer list, the transmitting node 121 will remove the receiving node 122, Node N, from its defer list Rx if the receiving node 122, Node N, is on the list. The transmitting node 121 will defer its transmissions, regardless of intended receiver, if any node in the defer list Rx is sensed receiving. By sensing the receiving node 122, node N, as receiving it is meant that a transmission from any node with the receiving node 122 node with N as a recipient is sensed.

Figure 7:
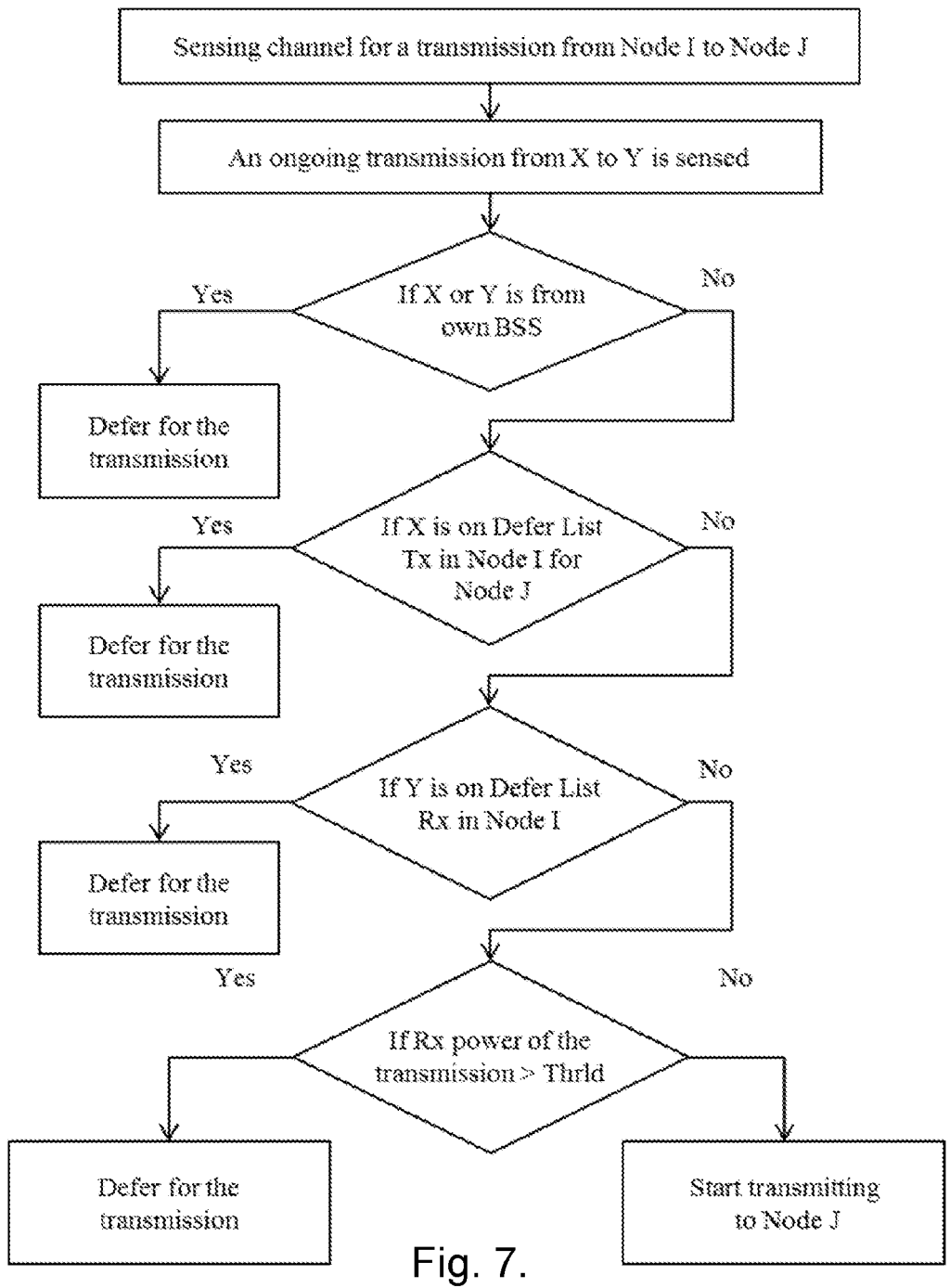
FIG. 7 is a flowchart depicting embodiments of a method.

An example of the rules associated with defer list Tx and defer list Rx are shown in FIG. 7. In FIG. 7, the transmitting node 121 represented by Node I and the receiving node 122 is represented by Node J.

When sensing channel for transmission from the transmitting node 121, Node I, to the receiving node 122, Node J, and an OBSS ongoing transmission from a Node X to a Node Y is sensed, the transmitter will defer channel access if Node X is on the Defer List Rx or Node Y is on the defer list Rx in the transmitter.

In the last step, the Rx power of the Node X of the ongoing transmission is compared with a power threshold (Thrld). The power threshold may be configured to a high value to increase spatial reuse of the system. A high threshold setting increases the risk of having strong interference during transmission, the provided defer lists reduces the risk significantly.

Detailed procedures and methods are explained in the examples below.

For each receiver node n such as the receiving node 122 in the network, a Defer List $L_{ns}$ is formed for the associated transmitter s such as the transmitting node 121, such that an OBSS node o such as any of the nodes 123, 131, 132 is listed in $L_{ns}$ if the condition $$\frac{P_s}{P_o} < T$$

is fulfilled, where $P_s$ is the received power of the desired signal, $P_o$ is the received power from node o and T is a threshold value. $T=T_{STA}$ if node n is a STA and $T=T_{AP}$ if node n is an AP. If node n is an AP, $P_s$ is the received power from associated STA s. If node n is a STA only one list $L_{ns}$ is formed, since it only receives desired signals from its associated AP.

Other conditions may be used to form the defer list. For example, $P_o$ is larger than an interference power threshold.

The lists $\{L_{ns}\}$ are then distributed over the network, in the same BSS so that the transmitting node 121 has access to the receiving node 122 $L_{ns}$, to use as a Defer List Tx. The defer lists may also be distributed between OBSSs so that the transmitting node 121 knows on which OBSS lists $\{L_{xy}\}$ it is occurring, and can create a defer list Rx, where x and y are two nodes in an OBSS.

For a transmission from transmitter i to receiver j the transmitter then forms a defer list All $D_{ij}$ by combining the defer list Tx for receiver j, and its own defer list Rx. This list will contain the nodes k fulfilling any of the three conditions
1. k∈BSS
2. k∈$L_{ji}$
3. i∈$L_{km}$ where m is any transmitter such as node 123 associated to node k such as node 132, and where the transmitting node 121 is represented by transmitter i and the receiving node 122 is represented by j.

If i detects an ongoing transmission from node k∈$D_{ij}$ if the condition 2 is fulfilled, or to node k∈$D_{ij}$ if the condition 3 is fulfilled, or from or to node k∈$D_{ij}$ if the condition 1 is fulfilled, it defers from transmitting. The reasons may for example be the following:

1. It is not wanted to transmit at the same time as another transmission within the same BSS, for example if an UL transmission is already ongoing, the AP cannot receive another transmission.
2. Node k will cause too high interference to the intended receiver, node j.
3. Node i will cause too high interference to the ongoing transmission towards node k.

The list may also be used to identify a hidden node. For example, a receiving node j put interferer node k in the defer list as a strong interference. When transmitter i starts a transmission towards receiver j, it should defer for the transmission from interferer k. However, if k is never sensed by the transmitter i, node k may be a hidden node to the transmitter i. In this case, procedures solving the hidden node problem, e.g. Request to send (RTS)/Clear to Send (CTS), may be triggered by the transmitter i when transmitting to the receiver j.

Contents in the Defer List

The nodes on the defer list cause strong interference to the receiving node 122. The Defer List may comprise node identifiers to identify the nodes on the defer list. In some embodiments, the identifiers may be MAC addresses. In some other embodiments, the Defer List may also be formed using Partial Association Identifier (PAID), stated in the SIG A1 field of the Very High Throughput (VHT) preamble relating to protocol 802.11 MAC & PHY. When a STA transmits to an AP this field comprises a bitwise part of the BSS Identifier (BSSID) of the receiving AP, and when an AP transmits to a STA the PAID is a combination of the AID of the STA and the BSSID of the AP.

Discriminating Between BSS and OBSS Nodes

In the PHY header the PAID field is decoded, which gives information on k, the sensed node such as any of the nodes 133 or 132 or 123, when trying to access the channel, an Association Identifier (AID) value. If the read BSSID value is identical to the BSSID of the serving AP of the transmitting node 121, e.g. if the receiving node 122 is transmitting to the transmitting node 121, it senses the channel and identifies a transmission in the BSS of the transmitting node 121, then this is a transmission in the same BSS. This is in the case of a STA or to the transmitting node 121 itself in the case of an AP, the detected signal is defined as OBSS. OBSS is an overlapping BSS, such as a neighbour BSS with overlapping coverage area.

Identifying Transmitter and Receiver of a Transmission

To use the defer list Rx, the transmitter or receiver of an ongoing transmission needs to be identified.

Depending on the different identifiers stored in the defer lists, different methods may be applied.

When MAC addresses are stored, a node may obtain the MAC addresses of the transmitter and receiver of a transmission by decoding MAC headers.

When PAIDs are stored, PAIDs may be obtained from PLOP preambles of a transmission.

Distribution of Lists in the Network

With the notation of section 6, Lists $L_{ji}$ are shared directly from the receiver node j such as the receiving node 122 to the transmitting node i such as the transmitting node 121.

List $L_{km}$ falls into four cases:

K is an index denoting the different possible transmitting nodes to receive the list from receiver m.

1) i is an AP and k is an AP: direct sharing of $L_{km}$ between APs.

2) i is an AP and k is a STA with serving AP m: $L_k$ is shared from k to m to i.

3) i is a STA with serving AP n and k is an AP: $L_{km}$ is shared from k to n to i.

4) i is a STA with serving AP n and k is a STA with serving AP m: $L_k$ is shared from k to m to n to i.

In the cases 3 and 4 the complete lists are not sent to the STA node i, rather the MAC addresses of the nodes k for which condition 3 as also is mentioned above is fulfilled, namely i∈$L_{km}$.

Implementation of the List Distribution

When the defer list is exchanged between an AP and an associated STA such as e.g. between the receiving node 122 and the transmitting node 121, the list may be sent as a dedicated control frame.

When the list is exchanged between two nodes that do not belong to the same BSS, such as e.g. the node 132 and 133, the list may be broadcasted if the two nodes are in the broadcasting range of each other.

When the list is exchanged between two APs, such as the receiving node 122 and the node 123 there may be a backhaul link connecting the APs. As an alternative, the two APs may be connected to a common management node, e.g. an AC. And the list may be exchanged via the management node.

A node may further transfer received lists to other nodes. For example, an AP such as the receiving node 122 may receive the lists of associated STAs such as the receiving node 122 and pass the lists to neighbor Aps.

Figure 8:
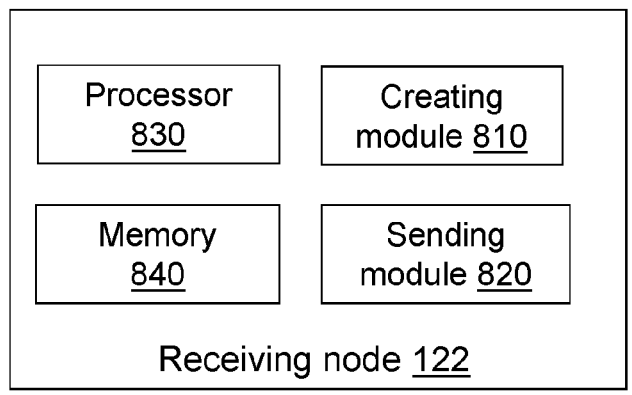
FIG. 8 is a schematic block diagram illustrating embodiments of a receiving node.

To perform the method actions for assisting the transmitting node 121 in handling a channel access for transmitting data to the receiving node 122, described above in relation to FIG. 4, the receiving node 122 may comprise the following arrangement depicted in FIG. 8. As mentioned above the transmitting node 121 and the receiving node 122 are adapted to operate in a wireless communications network 100.

The receiving node 122 is configured to, e.g. by means of a creating module 810 configured to, create a first defer list, in which first defer list a node 131, 132, 133 is adapted to be added when causing a SIR below a threshold at the receiving node 122.

The receiving node 122 is configured to, e.g. by means of a sending module 820 configured to send the created first defer list to the transmitting node 121. The first defer list enables the transmitting node 121 to decide whether or not to defer channel access to a sensed wireless channel for the data transmission, when the transmitting node 121 intends to transmit data to the receiving node 122.

In some embodiments, the first defer list is further adapted to be transmitted to one or more nodes in a neighbouring Basic Service Set, BSS. The neighbouring BSS is a neighbour to a BSS associated with the receiving node 122 or to an Overlapping BSS, OBSS.

In some embodiments the receiving node 122 further is configured to e.g. by means of the sending module 820 configured to transmit the first defer list to the transmitting node 121, when the transmitting node 121 causes a SIR, below the threshold at the receiving node 122.

The first defer list may be adapted to comprise any one or more out of a defer list relating to reception, defer list Rx, and a defer list relating to transmission, defer list Tx.

The embodiments herein comprising the process of for assisting the transmitting node 121 in handling a channel access for transmitting data to the receiving node 122 may be implemented through one or more processors, such as a processor 830 in the receiving node 122 depicted in FIG. 8, together with computer program code for performing the functions and actions of the embodiments herein. The program code mentioned above may also be provided as a computer program product, for instance in the form of a data carrier carrying computer program code for performing the embodiments herein when being loaded into the receiving node 122. One such carrier may be in the form of a CD ROM disc. It is however feasible with other data carriers such as a memory stick. The computer program code may furthermore be provided as pure program code on a server and downloaded to the receiving node 122.

The receiving node 122 may further comprise a memory 840 comprising one or more memory units. The memory 840 comprises instructions executable by the processor 830.

The memory 840 is arranged to be used to store e.g. defer lists, data, configurations, and applications to perform the methods herein when being executed in the receiving node 122.

Those skilled in the art will also appreciate that the creating module 810, and the sending module 820, described above may refer to a combination of analog and digital circuits, and/or one or more processors configured with software and/or firmware, e.g. stored in the memory 840, that when executed by the one or more processors such as the processor 830 as described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Figure 5:
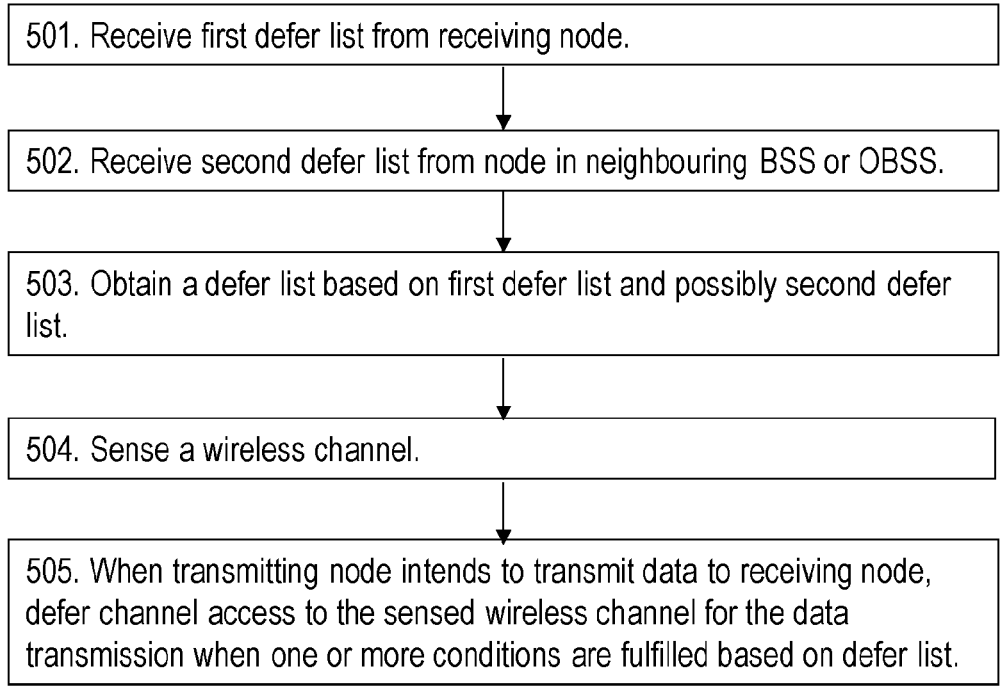
FIG. 5 is a flowchart depicting embodiments of a method in a transmitting node.
Figure 9:
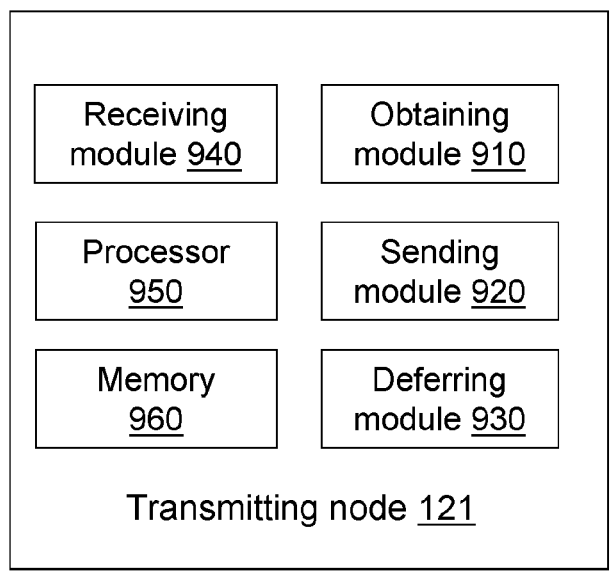
FIG. 9 is a schematic block diagram illustrating embodiments of a transmitting node.

To perform the method actions for handling a channel access for transmitting data to a receiving node 122, in relation to FIG. 5, the transmitting node 121 may comprise the following arrangement as depicted in FIG. 9. As mentioned above, the transmitting node 121 and the receiving node 122 are adapted to operate in a wireless communications network 100.

The transmitting node 121 is configured to, e.g. by means of an obtaining module 910 configured to, obtain a defer list. The defer list is adapted to comprise nodes 131, 132, 133 causing a SIR below a threshold at the receiving node 122. The defer list is adapted to be based on a first defer list received from and created by the receiving node 122.

The transmitting node 121 may further be configured to e.g. by means of the obtaining module 910 configured to, obtain the defer list by forming the defer list in the transmitting node 121 based on said received first defer list.

The transmitting node 121 is further configured to, e.g. by means of a sensing module 920 configured to, sense a wireless channel in the wireless communications network 100.

The transmitting node 121 is further configured to, e.g. by means of a deferring module 930 configured to, defer channel access to the sensed wireless channel for the data transmission, when the transmitting node 121 intends to transmit data to the receiving node 122 and when one or more conditions are fulfilled. The one or more conditions comprise at least that one or more nodes are sensed as communicating and being on the defer list.

The defer list may be adapted to comprise any one or more out of:
 a defer list relating to reception, defer list Rx, and
 a defer list relating to transmission, defer list Tx.

The one or more conditions to be fulfilled relating to the one or more nodes being sensed as communicating and being on the defer list may be adapted to comprise any one out of:
 a first node 131 is sensed as transmitting and which first node 131 is on the Defer List Tx, and
 a second node 132 is sensed as receiving and which second node 133 is on the Defer List Rx.

The Defer List Tx may be adapted to be based on the first defer list received from and created by the receiving node 122.

The Defer List Rx may be adapted to be based on a second defer list, which second defer list is adapted to be received from a node 123 in a neighbouring Basic Service Set, BSS. The neighbouring BSS is a neighbour to a BSS in which the transmitting node 121 is operating.

The one or more conditions to be fulfilled may further be adapted to comprise that a third node 133 is sensed as transmitting and which third node 133 is operating in the same BSS as the transmitting node 121.

In some embodiments, the one or more conditions to be fulfilled are further adapted to comprise that a receiving power at the transmitting node 121 is above a threshold.

The transmitting node 121 may further be configured to, e.g. by means of a receiving module 940 configured to, receive the first defer list from the receiving node 122.

The transmitting node 121 may further be configured to, e.g. by means of the receiving module 940 configured to, receive the first defer list from the receiving node 122.

The transmitting node 121 may further be configured to, e.g. by means of the receiving module 940 configured to, receive the second defer list from a node 123 in a neighbouring BSS.

The transmitting node 121 may further be configured to, e.g. by means of the obtaining module 910 configured to, obtain the defer list by updating a previous defer list comprised in the transmitting node 121 based on said received first defer list.

The transmitting node 121 may further be configured to, e.g. by means of the obtaining module 910 configured to, obtain the defer list by forming the defer list in the transmitting node 121 further based on said received second defer list.

The transmitting node 121 may further be configured to, e.g. by means of the receiving module 940 configured to, receive the second defer list from a node 123 in a neighbouring BSS.

The transmitting node 121 may further be configured to, e.g. by means of the obtaining module 910 configured to, obtain the defer list by updating a previous defer list comprised in the transmitting node 121 further based on said received second defer list.

The embodiments herein comprising the process of handling a channel access for transmitting data to a receiving node 122 may be implemented through one or more processors, such as the processor 950 in the transmitting node 121 depicted in FIG. 9, together with computer program code for performing the functions and actions of the embodiments herein. The program code mentioned above may also be provided as a computer program product, for instance in the form of a data carrier carrying computer program code for performing the embodiments herein when being loaded into the transmitting node 121. One such carrier may be in the form of a CD ROM disc. It is however feasible with other data carriers such as a memory stick. The computer program code may furthermore be provided as pure program code on a server and downloaded to the transmitting node 121.

The transmitting node 121 may further comprise a memory comprising one or more memory units, such as such as the memory 960 in the transmitting node 121 depicted in FIG. 9. The memory 960 comprises instructions executable by the processor 950.

The memory 960 is arranged to be used to store e.g. defer lists, data, configurations, and applications to perform the methods herein when being executed in the defer lists, data, configurations, and applications.

Those skilled in the art will also appreciate that the modules in the defer lists, data, configurations, and applications described above may refer to a combination of analog and digital circuits, and/or one or more processors configured with software and/or firmware, e.g. stored in the memory 960 in the transmitting node 121 that when executed by the one or more processors such as the processor 950 as described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method performed by a transmitting node for handling a channel access for transmitting data to a receiving node, the transmitting node and the receiving node operating in a wireless communications network, the method comprising:
 obtaining a defer list, which defer list comprises nodes causing Signal to Interference Ratio, SIR, below a threshold at the receiving node, and which defer list is based on a first defer list received from and created by the receiving node,
 sensing a wireless channel in the wireless communications network,
 when the transmitting node intends to transmit data to the receiving node, deferring channel access to the sensed wireless channel for the data transmission when one or more conditions are fulfilled, which one or more conditions comprise at least that one or more nodes are sensed as communicating and being on the defer list.

2. The method according to claim 1, wherein the defer list comprises any one or more out of:
   a defer list relating to reception, defer list Rx, and
   a defer list relating to transmission, defer list Tx.

3. The method according to claim 2, wherein the one or more conditions to be fulfilled relating to the one or more nodes being sensed as communicating and being on the defer list comprises any one out of:
   a first node is sensed as transmitting and which first node is on the Defer List Tx, and
   a second node is sensed as receiving and which second node is on the Defer List Rx.

4. The method according to claim 3, wherein the Defer List Tx is based on the first defer list received from and created by the receiving node.

5. The method according to claim 3, wherein the Defer List Rx is based on a second defer list, which second defer list is received from a node in a neighbouring Basic Service Set, BSS, which neighbouring BSS is neighbouring to a BSS in which the transmitting node is operating.

6. The method according to claim 1, wherein the one or more conditions to be fulfilled further comprises that a third node is sensed as transmitting and which third node is operating in the same BSS as the transmitting node.

7. The method according to claim 1, wherein the one or more conditions to be fulfilled further comprises that a receiving power at the transmitting node is above a threshold.

8. The method according to claim 1, further comprising:
   receiving the first defer list from the receiving node, and
   wherein obtaining the defer list comprises forming the defer list in the transmitting node based on said received first defer list.

9. The method according to claim 1, further comprising:
   receiving the first defer list from the receiving node, and
   wherein obtaining the defer list comprises updating a previous defer list comprised in the transmitting node based on said received first defer list.

10. The method according to claim 1, further comprising:
    receiving a second defer list from a node in a neighbouring BSS, and
    wherein obtaining the defer list comprises forming the defer list in the transmitting node further based on said received second defer list.

11. The method according to claim 1, further comprising:
    receiving a second defer list from a node in a neighbouring BSS, and
    wherein obtaining the defer list comprises updating a previous defer list comprised in the transmitting node further based on said received second defer list.

12. A transmitting node for handling a channel access for transmitting data to a receiving node, the transmitting node and the receiving node being adapted to operate in a wireless communications network, the transmitting node being configured to:
    obtain a defer list, which defer list is adapted to comprise nodes causing Signal to Interference Ratio, SIR, below a threshold at the receiving node, and which defer list is adapted to be based on a first defer list received from and created by the receiving node,
    sense a wireless channel in the wireless communications network,
    defer channel access to the sensed wireless channel for the data transmission when the transmitting node intends to transmit data to the receiving node and when one or more conditions are fulfilled, which one or more conditions comprise at least that one or more nodes are sensed as communicating and being on the defer list.

13. The transmitting node according to claim 12, wherein the defer list is adapted to comprise any one or more out of:
    a defer list relating to reception, defer list Rx, and
    a defer list relating to transmission, defer list Tx.

14. The transmitting node according to claim 13, wherein the one or more conditions to be fulfilled relating to the one or more nodes being sensed as communicating and being on the defer list is adapted to comprise any one out of:
    a first node is sensed as transmitting and which first node is on the Defer List Tx, and
    a second node is sensed as receiving and which second node is on the Defer List Rx.

15. The transmitting node according to claim 14, wherein the Defer List Tx is adapted to be based on the first defer list received from and created by the receiving node.

16. The transmitting node according to claim 14, wherein the Defer List Rx is adapted to be based on a second defer list, which second defer list is adapted to be received from a node in a neighbouring Basic Service Set, BSS, which neighbouring BSS is neighbouring to a BSS in which the transmitting node is operating.

17. The transmitting node according to claim 12, wherein the one or more conditions to be fulfilled further is adapted to comprise that a third node is sensed as transmitting and which third node is operating in the same BSS as the transmitting node.

18. The transmitting node according to claim 12, wherein the one or more conditions to be fulfilled further is adapted to comprise that a receiving power at the transmitting node is above a threshold.

19. The transmitting node according to claim 12, further being configured to:
    receive the first defer list from the receiving node, and
    wherein the transmitting node further is configured to obtain the defer list by forming the defer list in the transmitting node based on said received first defer list.

20. The transmitting node according to claim 12, further being configured to:
    receive the first defer list from the receiving node, and
    wherein the transmitting node further is configured to obtain the defer list by updating a previous defer list comprised in the transmitting node based on said received first defer list.

21. The transmitting node according to claim 12, further being configured to:
    receive a second defer list from a node in a neighbouring BSS, and
    wherein the transmitting node further is configured to obtain the defer list by forming the defer list in the transmitting node further based on said received second defer list.

22. The transmitting node according to claim 12, further being configured to:
    receive a second defer list from a node in a neighbouring BSS, and
    wherein the transmitting node further is configured to obtain the defer list by updating a previous defer list comprised in the transmitting node further based on said received second defer list.

* * * * *